United States Patent
Bang

(10) Patent No.: US 9,199,664 B2
(45) Date of Patent: Dec. 1, 2015

(54) STEERING APPARATUS FOR HEV AND METHOD OF CONTROLLING THE SAME

(71) Applicant: Hyundai Motor Company, Seoul (KR)

(72) Inventor: Jin Seok Bang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 165 days.

(21) Appl. No.: 13/859,231

(22) Filed: Apr. 9, 2013

(65) Prior Publication Data

US 2014/0180545 A1   Jun. 26, 2014

(30) Foreign Application Priority Data

Dec. 21, 2012 (KR) .................. 10-2012-0150356

(51) Int. Cl.
*B62D 5/065* (2006.01)
*B62D 5/04* (2006.01)

(52) U.S. Cl.
CPC ............ *B62D 5/0463* (2013.01); *B62D 5/0481* (2013.01); *B62D 5/065* (2013.01)

(58) Field of Classification Search
CPC ........................... B60W 20/40; Y02T 10/6286
USPC ....................................................... 701/41–44
See application file for complete search history.

(56) References Cited

U.S. PATENT DOCUMENTS

| | | | | |
|---|---|---|---|---|
| 5,704,446 | A * | 1/1998 | Chandy et al. ................ 180/446 |
| 5,711,394 | A * | 1/1998 | Fujii et al. ..................... 180/422 |
| 6,101,435 | A * | 8/2000 | Baughn et al. .................. 701/41 |
| 2008/0277187 | A1* | 11/2008 | Williams et al. ............... 180/422 |
| 2010/0056326 | A1* | 3/2010 | Kahn et al. ......................... 477/3 |
| 2012/0253588 | A1* | 10/2012 | Ghoneim ...................... 701/32.9 |
| 2012/0290175 | A1* | 11/2012 | Hisanaga ......................... 701/41 |
| 2013/0037341 | A1* | 2/2013 | Sakamaki ..................... 180/422 |
| 2013/0175111 | A1* | 7/2013 | Blond et al. .................. 180/423 |
| 2013/0197757 | A1* | 8/2013 | Ellis ................................ 701/41 |

FOREIGN PATENT DOCUMENTS

| | | |
|---|---|---|
| JP | 2005096729 A | 4/2005 |
| JP | 2005-132201 A | 5/2005 |
| JP | 2006096310 A | 4/2006 |
| JP | 2006-213094 A | 8/2006 |
| KR | 10-2002-0072685 A | 9/2002 |
| KR | 10-2010-0063290 | 6/2010 |
| WO | WO 2011061753 A1 * | 5/2011 |

* cited by examiner

*Primary Examiner* — Thomas G Black
*Assistant Examiner* — Sara Nelson
(74) *Attorney, Agent, or Firm* — Mintz Levin Cohn Ferris Glovsky and Popeo, P.C.; Peter F. Corless

(57) ABSTRACT

A steering apparatus for a HEV which assists in providing power steering regardless whether an engine is being operated, and a method of controlling the same. More specifically, one or more detectors detect a vehicle speed, a steering angle, and an engine RPM, and a pump is controlled according to the engine RPM based upon signals received from the one or more detectors. Additionally, an electric motor unit (EMU) mounted to a steering column unit separately from the power steering pump, provides power assisting in steering the vehicle. Also a hybrid control unit (HCU) receives a signal from one or more of the detectors to control a power steering pump and an electric motor unit as required.

6 Claims, 3 Drawing Sheets

STEERING APPARATUS FOR HEV AND METHOD OF CONTROLLING THE SAME

CROSS-REFERENCE TO RELATED APPLICATION

This application claims under 35 U.S.C. §119(a) the benefit of Korean Patent Application No. 10-2012-0150356 filed Dec. 21, 2012, the entire contents of which are incorporated herein by reference.

BACKGROUND (a) Technical Field

The present invention relates to a steering apparatus for a HEV which assists in providing steering power for a driver independent of engine operation, and a method of controlling the same.

(b) Background Art

In general, a hybrid electric vehicle (HEV) refers to a vehicle in which a non-internal combustion engine is combined with an electric motor to improve the fuel efficiency of the internal combustion engine. A hybrid electric vehicle is capable of traveling in a pure electric vehicle (EV) mode, a pure internal combustion mode and a hybrid electric (HEV) mode. In a pure electric mode, power from a motor is transmitted to a transmission so that only the power from the motor is used to power the vehicle. Additionally, hybrid electric vehicles also often include a battery charging mode in which an engine or regenerative braking is used to recharge the battery which is used to provide power to the motor.

In a hybrid vehicle, since a clutch is arranged between the engine and the motor to transmit a power from the engine to a driving shaft, in an HEV travel mode power from the motor can be used to act as an auxiliary power source while the engine acts as a main power source.

Most hybrid electric buses employ a hydraulic pump directly connected to an engine to assist in providing steering power to a driver like a conventional bus. However, an engine is frequently stopped, for example, in the EV travel mode to improve fuel ratio due to characteristics of the hybrid electric vehicle, in which case since the hydraulic pump which assists in providing power for steering is also stopped, power steering is not available while the engine is not running and thus it is difficult for the driver to steer.

Further, the hybrid electric vehicle utilizes engine which output a lower amount of power which can be applied to the hydraulic pump model (for example, 290 ps→240 ps), in which case the typical hydraulic pump cannot be used, thus a hydraulic pump which can operate on less pressure should be used in a hybrid vehicle. However, such a hydraulic pump would not be sufficient to operate a steering apparatus for a vehicle such as a large truck or bus.

SUMMARY OF THE DISCLOSURE

The present invention provides a steering apparatus for a hybrid electric vehicle which assists in providing power for steering a vehicle regardless of whether or not an engine is currently in operation by using an electric motor unit mounted to a steering column unit separately from a hydraulic pump, and a method of controlling the same.

In accordance with an aspect of the present invention, there is provided a steering apparatus of a hybrid electric vehicle, including: a detector configured to detect a vehicle speed, a steering angle, and an engine revolutions per minute (RPM); a power steering pump controlled according to the engine RPM, that provides a power for steering of a steering wheel; an electric motor unit (EMU) mounted to a steering column unit separately from the power steering pump 10, that provides power for steering of the steering wheel; and a hybrid control unit (HCU) for receiving a signal of the detector to control a power steering pump and an electric motor unit, wherein a steering power of a driver is assisted regardless of whether or not the engine is being operated.

In one embodiment of the present invention, the EMU includes: a torque/angle sensor installed in the steering column unit. The torque/angle sensor measures a steering torque and an angle of the steering column. The EMU also includes an electric motor whose torque is controlled by the HCU, and a reduction gear that reduces a rotation speed of the electric motor according to control from the HCU.

In accordance with another aspect of the present invention, there is provided a method of controlling a steering apparatus of a hybrid electric vehicle, the method including: determining, by one or more controllers, whether an engine is driven; measuring, by the one or more detectors, an engine RPM, a vehicle speed, a steering angle, and a steering angular speed; in response to determining that the engine is being operated, receiving, at the one or more controllers, signals regarding the engine RPM, the vehicle speed, the steering angle, and the steering angular speed, and controlling a power steering pump according to the engine RPM; and in response to determining that the engine is not being operated, controlling an operation of the electric motor unit to provide additional power to the steering apparatus and wheel.

In one embodiment of the present invention, the electric motor unit is controlled in a motor torque control method, and when the vehicle is traveling at a low speed of a reference speed or lower and the steering angle is a preset value or higher, the driver is assisted by the power steering apparatus.

The advantages of a steering apparatus for a hybrid electric vehicle and a method of controlling the same according to the present invention are as follows.

First, when a power steering pump (hydraulic pump) for a low output engine is utilized in the vehicle, sufficient power can still be provided for larger vehicles. Second, when the power steering pump breaks down, the EMU can be used as an emergency steering apparatus. Third, when an ISG mode is applied to a hybrid electric bus, the hybrid electric bus may be steered by the EMU while an engine is stopped. Fourth, a travel stability of a vehicle can be improved by performing collective control in the HCU in association with the EMU and the VDC.

Fifth, according to the related art, a steering system employing both electric hydraulic power steering (EHPS) (control of a motor RPM) and motor driven power steering (MDPS) has been released. However, since the two systems require separate controllers and control methods are different for the systems, a time delay is generated causing unnecessary energy loss. Meanwhile, since the present invention employs hydraulic power steering (HPS) (engine RPM control) and an EMU (motor torque control) and does not require a separate controller as a motor torque of the EMU, controls can be performed easily and system costs are reduced in comparison to the related art.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
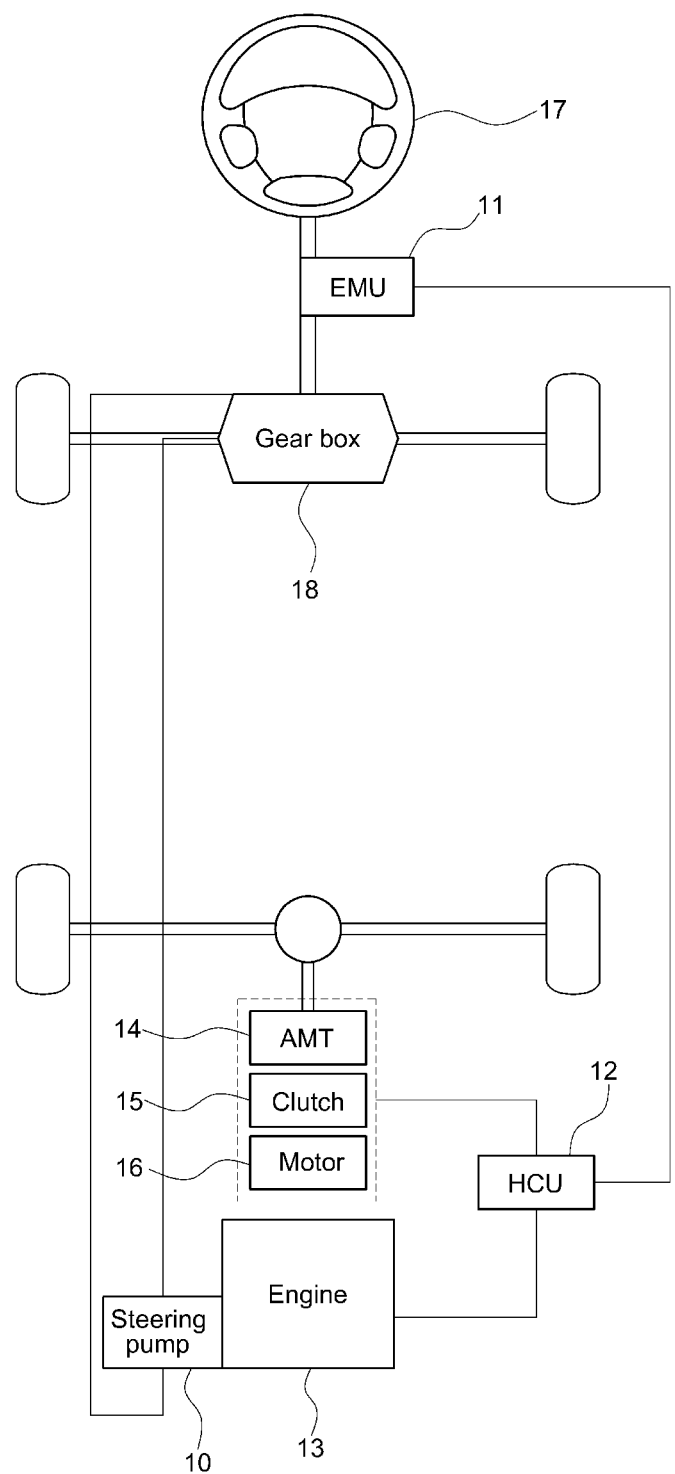
FIG. 1 is a schematic view showing a steering apparatus of a large scale hybrid electric bus according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings so that those skilled in the art to which the present invention pertains can easily carry out the invention.

Figure 2:
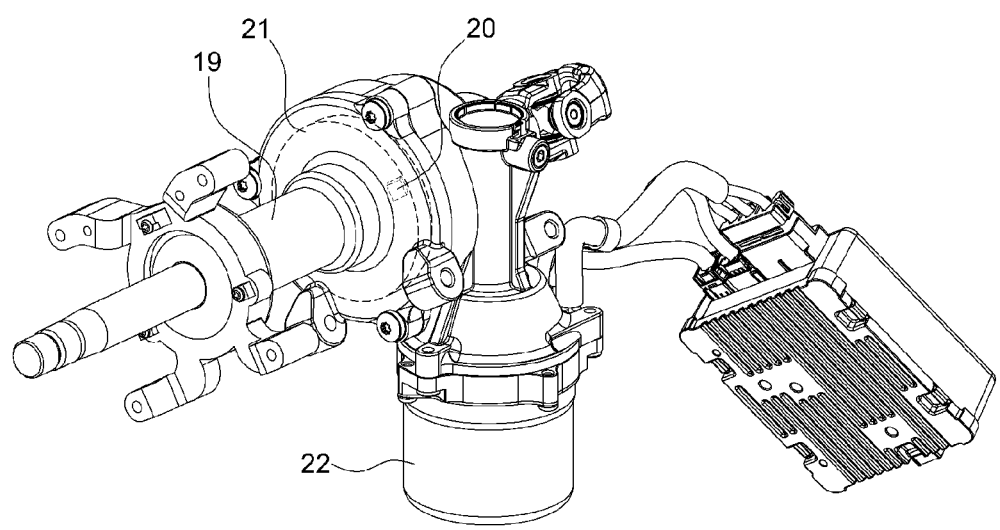
FIG. 2 is a perspective view showing an electric motor unit of FIG. 1.

FIG. 1 is a schematic view showing a steering apparatus of a large scale hybrid electric bus according to an exemplary embodiment of the present invention. FIG. 2 is a perspective view showing an electric motor unit of FIG. 1.

The present invention relates to a steering apparatus for a hybrid electric vehicle which can assist power steering via an electric motor unit to improve stability of a vehicle, and a method of controlling the same.

The present invention can be applied to a hybrid vehicle, in particular, a large scale hybrid electric bus. The steering apparatus for a hybrid electric vehicle according to the present invention employs both a power steering pump 10 directly connected to an engine and an electric motor unit (EMU) 11 for assisting the power steering pump 10 to assist driver in steering.

Further, the present invention includes a detector that detects a vehicle speed, an engine RPM, a steering angle, a steering angular speed, and the like, and a hybrid control unit (HCU) 12 that receives a signal from the detector and controls, via a processor, the power steering pump 10 and the EMU 11.

In this case, the power steering pump 10 has the same construction as the related art, and a detailed description thereof will be omitted. However, an operation of the power steering pump 10 is controlled according to an engine RPM when the engine 13 being driven. Further, an automated manual transmission (AMT) 14 connected to a rear wheel of the hybrid electric vehicle, a clutch 15, a motor 16, an engine 13, and the like is collectively controlled by the HCU 12. The HCU 12 receives an engine RPM, a vehicle speed, and the like, and performs an overall control such as an assist control, a damping control, a return control, a torque control, and the like. The electric motor unit 11 is mounted to a steering column unit 19, and includes an electric motor 22, a torque/angle sensor 20, and a reduction gear 21. Additionally, the gearbox 18 may be installed within a front axle of the vehicle.

The EMU 11 assists in steering the vehicle when the power steering pump 10 lacks the capacity to do so regardless of whether engine 13 is currently being operated. For example, while traveling at lower speeds (i.e., less than 20 kph) or while making a full turn, the power steering pump 10 is not able to sufficiently provide enough power to fully assist in steering the vehicle, in which case steering power can be assisted by the EMU 11. Further, when idle stop & go (ISG) is applied, a steering function can be performed while the engine 13 is currently not being operated. Also, since a motor torque of the electric motor unit 11 is controlled by the HCU 12, the EMU 11 does not require a separate controller.

Hereinafter, a method of controlling a hybrid electric vehicle according to the present invention will be described.

Figure 3:
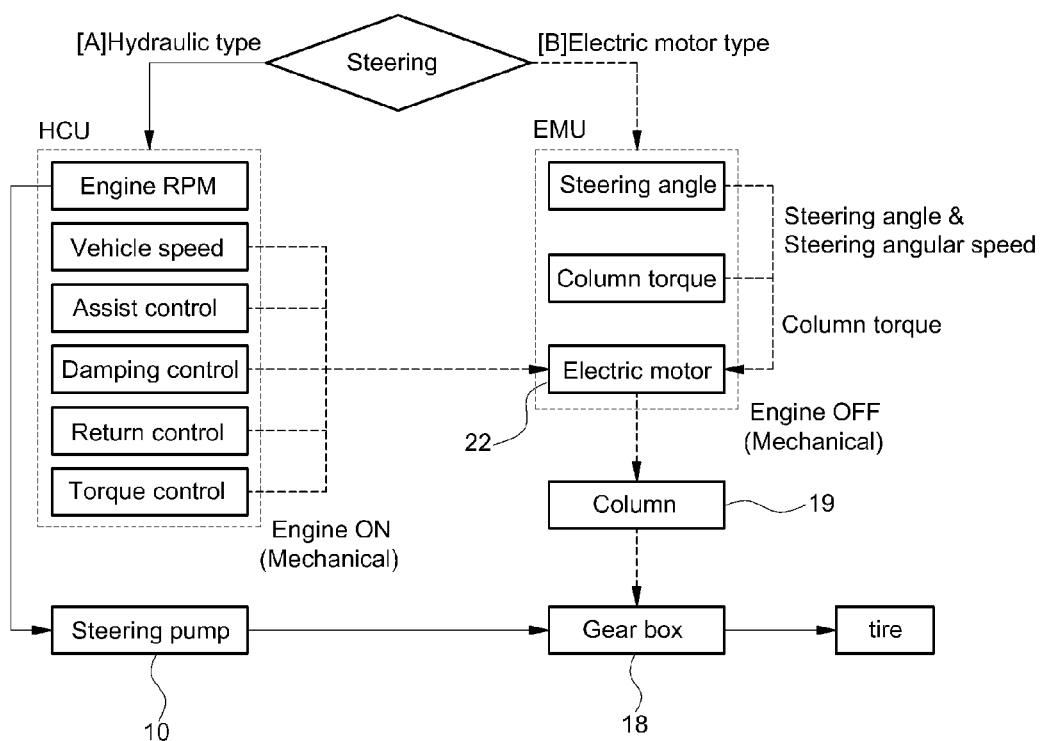
FIG. 3 is a schematic view showing a method of controlling the steering apparatus for a hybrid electric vehicle according to an exemplary embodiment of the present invention.

FIG. 3 is a schematic view showing a method of controlling the steering apparatus for a hybrid electric vehicle according to an exemplary embodiment of the present invention. The HCU 12 operates the power steering pump 10 according to an engine RPM when the engine 13 is driven, and controls the EMU 11 through auxiliary control, damping control, return control, torque control, and the like according to signals of a vehicle speed, a steering angle, a steering angular speed, and a column torque when the engine 13 is stopped, in order to assist a driver in steering a vehicle.

In particular, during low speed travel and while making a full turn, the electric motor unit 11 can assist the power steering pump 10 in providing sufficient power to the system. In particular, determination is made by the HCU whether or not the engine 13 is currently being operated When the engine 13 is not being operated during initial vehicle take off, a determination is then made as to whether a vehicle speed is traveling at 5 kph (kilometer per hour) or higher.

When a vehicle speed traveling at 5 kph or higher and the engine is being operated, the steering wheel 17 is operated by only the power steering pump 10. That is, in this case, the driver is assisted by only the power steering pump 10. Conversely, at a low speed and during a full turn, for example, when the vehicle speed is lower than 20 kph after the engine is being operated and the steering angle is greater than 300 degrees, the power steering pump 10 and the EMU 11 are used at the same time to assist a steering power of the driver.

Next, for example, when the engine 13 is stopped while the vehicle is operating under normal conditions, if the vehicle speed is greater than 5 kph and the steering angle is less than 180 degrees, the electric motor unit 11 is used to assist the driver in steering.

Further, when ISG is being operated, for example, when the engine 13 is stopped, the vehicle speed is less than 5 kph, and the steering angle is greater than 300 degrees, the EMU 11 is operated to assist the driver is steering the vehicle.

Table 1 shows a comparison result of steering performances of a hybrid electric vehicle according to the present invention and a general bus.

TABLE 1

| | Items | General bus Hydraulic type | Hybrid electric bus Hydraulic type | EMU |
|---|---|---|---|---|
| Hydraulic type | Relief pressure(bar) | 125 | 115 | — |
| | Hydraulic pressure | 100 | 100 | — |
| | Hydraulic assist force (kgf, 1 × 2) | 12,500 | 11,500 | — |
| EMU | a Motor rated torque(Nm) | — | — | 4.04 |
| | b Reduction gear ratio | — | — | 20.5 |
| Gear | c Gear ratio | — | — | 17 |
| | d Sector shaft PCD (mm) | — | — | 51 |
| e EMU assist force(kgf, (a × b × c) ÷ d) | | — | — | 2,814 |
| Total power assist force(kgf, 3 + e) | | 12,500 | 14,314 (1,814 margin) | |

Thus, according to the present invention, when a power steering pump (hydraulic pump) 10 for a low output engine is utilize, additional power can be supplied from the EMU. Furthermore, when the power steering pump 10 breaks down, the EMU 11 can be used as an emergency steering apparatus. Finally, when the ISG mode is applied to a hybrid electric bus, the hybrid electric bus may be steered by the EMU 11 while the engine is not being operated. As a result stability of a vehicle can be improved by performing a collective control in the HCU 12 in association with the EMU 11 and the VDC.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A steering apparatus of a hybrid electric vehicle, comprising:
    detectors configured to detect a vehicle speed, a steering angle, and an engine revolutions per minute (RPM);
    a power steering pump controlled according to the engine RPM, that provides power for steering of a steering wheel;
    an electric motor unit (EMU) mounted to a steering column unit separately from the power steering pump, the EMU providing power for steering of the steering wheel; and
    a hybrid control unit (HCU) configured to receive signals from the detectors to control both the power steering pump and the electric motor unit based on the signals received,
    wherein steering power is supplied regardless of whether or not the engine is being operated.

2. The steering apparatus of claim 1, wherein the EMU comprises:
    a torque/angle sensor installed in the steering column unit, and configured to measure a steering torque and an angle;
    an electric motor whose torque is controlled by the HCU in response to signals from the torque/angle sensor; and
    a reduction gear that reduces a rotational speed of the electric motor.

3. A method of controlling a steering apparatus of a hybrid electric vehicle, the method comprising:
    determining, by a controller, whether an engine is operating;
    measuring, by detectors, an engine revolutions per minute (RPM), a vehicle speed, a steering angle, and a steering angular speed;
    in response to the controller determining that the engine is operating, controlling a power steering pump according to the engine RPM based on signals received by a hybrid control unit (HCU) from the detectors regarding the engine RPM, the vehicle speed, the steering angle, and the steering angular speed; and
    in response to the controller determining that the engine is not operating, controlling an operation of the electric motor unit (EMU), by the HCU, to assist in steering of a steering wheel, wherein steering power is supplied regardless of whether or not the engine is being operated.

4. The method of claim 3, wherein the electric motor unit is controlled in a motor torque control method, and when the vehicle travels at a predetermined speed or lower and the steering angle is a preset value or higher, the EMU is operated to assist in steering the vehicle.

5. A non-transitory computer readable medium containing program instructions executed by a processor or controller, the computer readable medium comprising:
    program instructions that determine whether an engine is operating;
    program instructions that control, using a hybrid control unit (HCU), a power steering pump according to an engine revolutions per minute (RPM) based on signals received from detectors regarding the engine RPM, a vehicle speed, a steering angle, and a steering angular speed in response to determining that the engine is operating; and
    program instructions that control, using the HCU, an operation of an electric motor unit (EMU) to assist in steering of a steering wheel in response to the controller determining that the engine is not operating, wherein steering power is supplied regardless of whether or not the engine is being operated.

6. The non-transitory computer readable medium of claim 5, wherein the electric motor unit is controlled in a motor torque control program instructions, and when the vehicle travels at a predetermined speed or lower and the steering angle is a preset value or higher, the program instructions control EMU to assist in steering the vehicle.

* * * * *